(12) United States Patent
Carson et al.

(10) Patent No.: US 9,751,173 B2
(45) Date of Patent: Sep. 5, 2017

(54) TOOL MAGAZINE AND TOOL CHANGER

(71) Applicant: Yamazaki Mazak Corporation, Niwa-gun (JP)

(72) Inventors: Javon D. Carson, Mason, OH (US); Jonathon Marshall, Amelia, OH (US); Takuya Il, Florence, KY (US)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 15/348,987

(22) Filed: Nov. 11, 2016

(65) Prior Publication Data

US 2017/0057032 A1 Mar. 2, 2017

Related U.S. Application Data

(63) Continuation of application No. PCT/JP2015/075229, filed on Sep. 4, 2015.
(Continued)

(51) Int. Cl.
*B23Q 3/157* (2006.01)
*B23Q 3/155* (2006.01)

(52) U.S. Cl.
CPC ......... *B23Q 3/15724* (2016.11); *B23Q 3/157* (2013.01); *B23Q 3/15726* (2013.01);
(Continued)

(58) Field of Classification Search
CPC ......... Y10T 483/1891; Y10T 483/1836; Y10T 483/1762; B23Q 3/15724; B23Q 3/15726; B23Q 2003/15531; B23Q 3/15746
(Continued)

(56) References Cited

U.S. PATENT DOCUMENTS

| 4,117,586 A | 10/1978 | Uchida et al. |
| 4,164,809 A | 8/1979 | Tsuboi et al. |
| (Continued) | | |

FOREIGN PATENT DOCUMENTS

| CN | 201419334 Y | 3/2010 |
| CN | 102729085 | 10/2012 |
| (Continued) | | |

OTHER PUBLICATIONS

Search Report issued by National Patent Services, dated Apr. 9, 2014, Arlington, VA, USA.
(Continued)

*Primary Examiner* — Erica E Cadugan
(74) *Attorney, Agent, or Firm* — Mori & Ward, LLP

(57) ABSTRACT

A tool magazine includes at least one tool carriage movable along a circulation path. The tool holders each have tool pot sockets to which the tool pots are mountable. The tool holders are disposed pivotably about a pivot axis with respect to the at least one tool carriage. The tool pot sockets include a first and second tool pot sockets. An angle is created in a pivoting direction about the pivot axis between a first tool pot mounted to the first tool pot socket and a second tool pot mounted to the second tool pot socket. The turning device turns each of the tool holders about the pivot axis at a position on the circulation path. The tool pot stopper positions each of the tool pots and stops one of the first tool pot and the second tool pot at a pivotable location in the pivoting direction.

8 Claims, 10 Drawing Sheets

Related U.S. Application Data

(60) Provisional application No. 62/046,808, filed on Sep. 5, 2014.

(52) U.S. Cl.
CPC ........... *B23Q 2003/15531* (2016.11); *Y10T 483/1755* (2015.01); *Y10T 483/1836* (2015.01); *Y10T 483/1864* (2015.01); *Y10T 483/1891* (2015.01)

(58) Field of Classification Search
USPC .............................................. 483/68, 62, 42
See application file for complete search history.

(56) References Cited

U.S. PATENT DOCUMENTS

| | | | |
|---|---|---|---|
| 4,190,947 A | | 3/1980 | Sato et al. |
| 4,384,397 A | | 5/1983 | Nelson |
| 4,399,603 A | | 8/1983 | Reed |
| 4,430,717 A | | 2/1984 | Senda et al. |
| 4,637,120 A | | 1/1987 | Geiger |
| 4,699,276 A | | 10/1987 | Kis |
| 4,783,902 A | | 11/1988 | Novak |
| 5,142,766 A | | 9/1992 | Wehrmeister |
| 5,194,061 A | | 3/1993 | Lechleiter et al. |
| 5,281,194 A | | 1/1994 | Schneider |
| 5,496,249 A | | 3/1996 | Buggle et al. |
| 5,624,365 A | * | 4/1997 | Haninger ............ B23Q 3/1554 483/38 |
| 5,688,214 A | | 11/1997 | Mase et al. |
| 5,688,215 A | | 11/1997 | Mase et al. |
| 6,442,815 B1 | | 9/2002 | Moon et al. |
| 6,514,184 B2 | * | 2/2003 | Oitaka ............ B23Q 3/15526 483/60 |
| 7,575,543 B1 | * | 8/2009 | Sun .................... B23Q 3/15526 211/1.56 |
| 2007/0167303 A1 | | 7/2007 | Schmauder |
| 2012/0172186 A1 | * | 7/2012 | Sun ..................... B23Q 3/1572 483/68 |
| 2012/0220437 A1 | * | 8/2012 | Hayashi ............ B23Q 3/15706 483/30 |

FOREIGN PATENT DOCUMENTS

| | | |
|---|---|---|
| EP | 2505304 A1 | 3/2012 |
| JP | 56-021743 A * | 2/1981 |
| JP | 56-021744 A * | 2/1981 |
| JP | 60-078240 U | 5/1985 |
| JP | 60-123240 | 7/1985 |
| JP | 60-123241 | 7/1985 |
| JP | 01-121144 | 5/1989 |
| JP | 05-146937 | 6/1993 |
| KR | 20030069674 | 8/2003 |
| WO | WO 02/072309 | 9/2002 |

OTHER PUBLICATIONS

International Search Report for corresponding International Application No. PCT/JP2015/075229, dated Dec. 1, 2015.

Chinese Office Action for corresponding CN Application No. 201580003485.2, dated Dec. 5, 2016.

International Preliminary Report on Patentability (Chapter I) with translation of Written Opinion of the International Searching Authority for corresponding International Application No. PCT/JP2015/075229, dated Mar. 16, 2017.

* cited by examiner

TOOL MAGAZINE AND TOOL CHANGER

CROSS REFERENCE TO RELATED APPLICATIONS

The present application is a continuation application of International Application No. PCT/JP2015/075229, filed Sep. 4, 2015, which claims priority to U.S. Provisional Application No. 62/046,808, filed Sep. 5, 2014. The contents of these applications are incorporated herein by reference in their entirety.

BACKGROUND OF THE INVENTION

Field of the Invention

The present invention relates to a tool magazine and a tool changer.

Discussion of the Background

Tool storage magazines (hereinafter, referred to as tool magazines) are known for storing tools (e.g. a plurality of cutting tools, such as drill bits, reamers, taps, and mills), when the tools are not in use, while keeping the tools accessible to be used in the tool spindle of a machining center when required. The tools are typically stored in tool pots which are configured to each releasably hold a single tool. When a particular tool is needed, the tool pot holding the desired tool is brought to a tool change location. A tool changer will then remove the desired tool from the tool pot, and if another tool is already in the spindle, it will simultaneously be removed by the tool changer and placed into the tool pot from which the desired tool has just been removed.

For example, U.S. Pat. No. 5,688,215, Japanese Unexamined Patent Application Publication No. S60-123241, and Japanese Unexamined Utility Model Application Publication No. S60-078240 each disclose the conventional technique relating to the invention.

SUMMARY OF THE INVENTION

According to one aspect of the present invention, a tool magazine includes at least one tool carriage, tool pots, tool holders, a turning device, and a tool pot stopper. The at least one tool carriage is movable along a circulation path. The tool pots include first tool pot and a second tool pot to hold a tool. The tool holders each have tool pot sockets to which the tool pots are mountable. The tool holders are disposed pivotably about a pivot axis with respect to the at least one tool carriage. The tool pot sockets include a first tool pot socket and a second tool pot socket. An angle is created in a pivoting direction about the pivot axis between the first tool pot mounted to the first tool pot socket and the second tool pot mounted to the second tool pot socket. The turning device turns each of the tool holders about the pivot axis at a position on the circulation path. The tool pot stopper positions each of the tool pots and stops one of the first tool pot and the second tool pot at a pivotable location in the pivoting direction.

According to another aspect of the present invention, a tool changer includes a tool magazine and a tool exchange arm. The tool magazine holds a tool. The tool magazine includes at least one tool carriage, tool pots, tool holders, a turning device, and a tool pot stopper. The at least one tool carriage is movable along a circulation path. The tool pots include first tool pot and a second tool pot to hold a tool. The tool holders each have tool pot sockets to which the tool pots are mountable. The tool holders are disposed pivotably about a pivot axis with respect to the at least one tool carriage. The tool pot sockets include a first tool pot socket and a second tool pot socket. An angle is created in a pivoting direction about the pivot axis between the first tool pot mounted to the first tool pot socket and the second tool pot mounted to the second tool pot socket. The turning device turns each of the tool holders about the pivot axis at a position on the circulation path. The tool pot stopper positions each of the tool pots and stops one of the first tool pot and the second tool pot at a pivotable location in the pivoting direction. The tool exchange arm exchanges the tool between the tool magazine and a spindle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
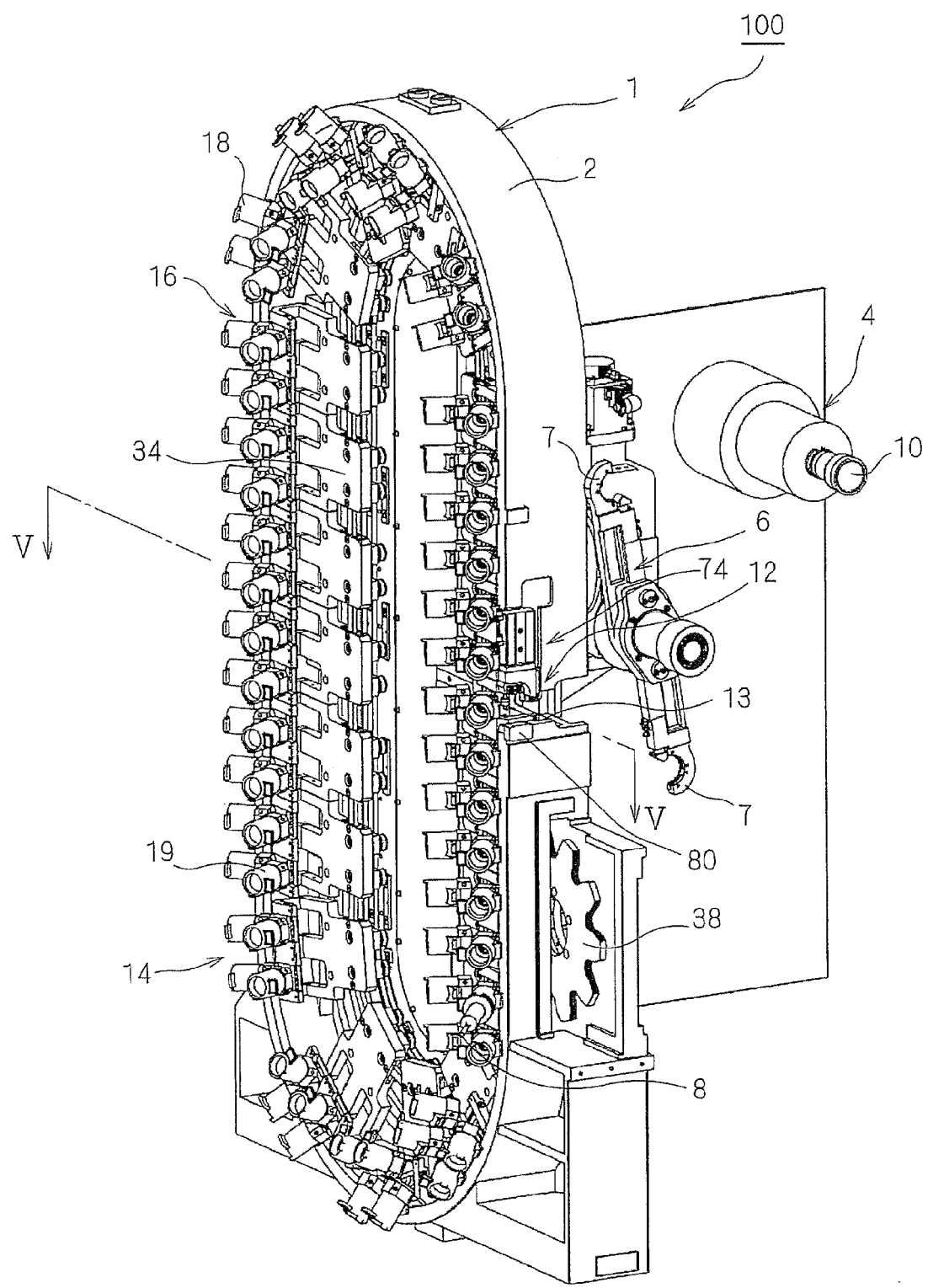
FIG. 1 is a perspective view of a schematic configuration of an exemplary tool changer.

The embodiments will now be described with reference to the accompanying drawings, wherein like reference numerals designate corresponding or identical elements throughout the various drawings.

In accordance with one aspect, a tool magazine in one form includes an endless rail having opposite inner and outer surfaces. A carriage member is configured to travel about the endless rail. To guide the carriage member about the endless rail, the carriage member includes at least one rail guide member configured to engage with the endless rail at the inner and outer surfaces. The carriage member has a tool holder shiftably connected to the carriage member, and the tool holder includes a tool pot operably connected to the tool holder for holding a tool. An actuator is provided for shifting the tool holder at a tool exchange location. The actuator is configured to shift the tool holder from a tool storage orientation and a tool exchange orientation. In the tool storage orientation, the tool pot is oriented such that the carriage member may travel about the guide rail. In the tool exchange orientation, the tool pot is oriented for removing a tool held by the tool pot and placing another tool remote from the tool pot into the tool pot.

In another form, a tool magazine includes an endless rail and a carriage member. The carriage member includes at least one rail guide member for guiding the carriage member about the endless rail. A tool holder including a plurality of tool pots each for holding a tool is connected to the carriage member. The tool holder is configured to be shifted into a plurality of different tool change orientations, including first and second tool exchange orientations. In the first tool exchange orientation, a tool held by one of the plurality of tool pots of the tool holder may be removed therefrom or a tool remote from the tool pots may be placed into one of the plurality of tool pots. In a second tool exchange orientation of the tool holder, another tool held by another one of the plurality of tool pots of the tool holder may be removed therefrom or the tool remote from the tool pots may be placed into the other one of the plurality of tool pots. Advantageously, the tool holder may be shifted into the first and second tool exchange orientations without moving the carriage members.

In some forms, a tool carriage for a tool magazine may include a carriage member and a guide member connected to the carriage member for guiding the carriage member along a guide surface. A tool holder may have first and second tool pots each configured to hold a tool. The tool holder is pivotally connected to the carriage member and is pivotable between a plurality of locations, including a first tool exchange orientation, wherein the tool holder is pivoted such that a first tool may be removed from or inserted into the first tool pot, and a second tool exchange orientation different from the first tool exchange orientation, wherein the tool holder is pivoted such that a second tool may be removed from or inserted into the second tool pot.

In other forms, a tool carriage for a tool magazine may include a carriage member for being guided about a tool magazine and a tool holder body pivotally connected to the carriage member. A plurality of tool pot sockets is disposed on the tool holder body for connecting one or more tool pots thereto. The tool holder body is configured to pivot between a plurality of tool exchange orientations corresponding to a common position of the one or more tool pots relative to the carriage member for removing a tool held by or placing a tool into the one or more tool pots. With this configuration, the user may select how many tools may be held by the tool carriage by attaching one or more tool pots to the tool holder at the tool pot sockets.

In another form, a method of exchanging tools from a tool magazine includes at least one of the steps of: shifting one of a plurality of tool holders into a predetermined tool holder shifting position of the tool magazine; engaging a tool holder having first and second tool pots in the tool holder shifting position with an actuator for shifting the tool holder; shifting the tool holder with the actuator into one of first and second tool exchange orientations; and removing a tool from or inserting a tool into one of the first and second tool pots of the tool holder. Herein, the first tool exchange orientation is different from the second tool exchange orientation.

In one form, the tool holder is shiftable between three locations, including a storage orientation, a first tool exchange orientation, and a second tool exchange orientation. In the default storage orientation, one or two tools are held and stored by tool pots of the tool holder and may be conveyed around a guide track. To orient the tool holder in the first tool exchange orientation, the desired tool holder is conveyed to the tool transfer location and the tool holder is pivoted outwardly by an actuator. Thus, the first tool may be removed by the automated tool changer and replaced by the tool previously in the spindle. If a second tool is present on the tool holder, the tool holder may be pivoted further by the actuator to the second tool exchange orientation. Thus, the second tool may be removed from the second tool holder and/or replaced by the tool changer. After the exchange of tools is complete, the tool holder is pivoted back to the storage orientation. Thus, the carriages may be moved by a sprocket to move the next desired tool holder to the tool transfer location. The invention will now be further described in connection with an illustrated embodiment, although the invention is not limited to the illustrated embodiment.

EMBODIMENTS

Figure 2:
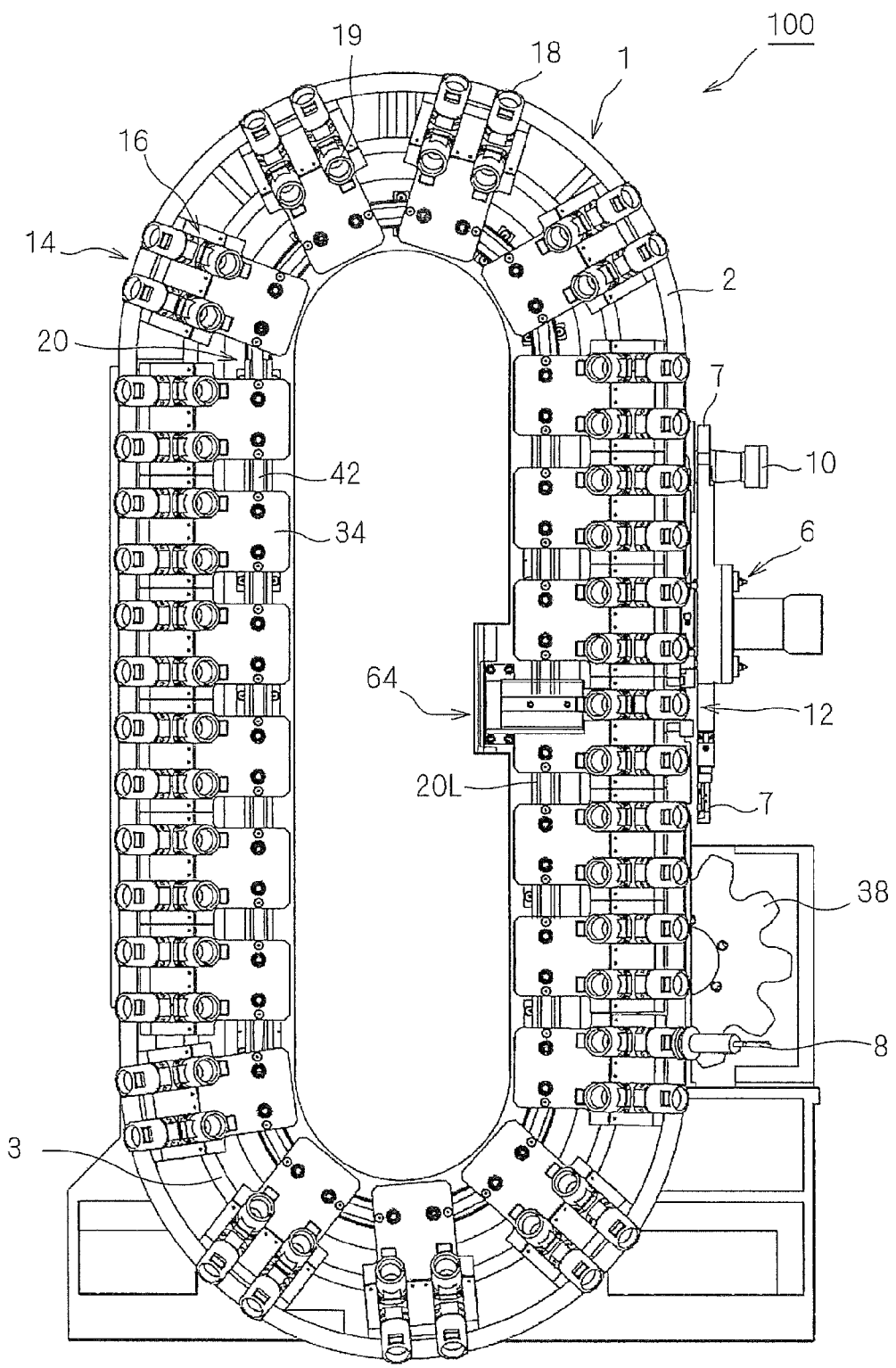
FIG. 2 is a front view of a tool magazine.

FIGS. 1 and 2 illustrate a tool changer 100 including a tool magazine 1 and a tool exchange arm 6. The tool magazine 1 holds a plurality of tools until they are required at a spindle 4. The tool magazine 1 includes a plurality of tool carriages 14 (see FIG. 3). Each of the tool carriages 14 has at least one tool holder 16. The tool holder 16 has at least one tool pot 18, 19 which will be described in greater detail below. As can be clearly understood from the following description, the tool magazine 1 includes a guide rail 20, the tool carriages 14, the tool pots 18, 19, the tool holders 16, a tool holder actuator 64, and a tool pot stopper 74.

The tool magazine 1 is configured to be operated in conjunction with the tool exchange arm 6. The tool exchange arm 6 includes a pair of tool grasping portions 7 for exchanging a tool between the tool magazine 1 and the spindle 4. The tool grasping portions 7 disposed opposite each other on the tool exchange arm 6 exchanges a first tool 8 held by a tool pot 18, 19 with a second tool 10 at the spindle 4. The tools are exchanged at a tool exchange location 12 of the tool magazine 1, as will be described in further detail below. The tool magazine 1 has an opening 13 in a magazine frame 2 to allow the tool pots 18, 19 to be accessed by the tool exchange arm 6, and also permits the tool pots 18, 19 to be rotated into the tool exchange location 12. In particular, the tool exchange arm 6 removes the first tool 8 from one of the tool pots 18, 19 at the tool exchange location 12 of the tool magazine 1 when the tool pot holding the first tool 8 is shifted into the tool exchange location 12 (see FIGS. 6, 7), and removes a second tool 10 from the spindle 4, rotates, replaces the second tool 10 in the same tool pot 18, 19 from which the first tool 8 was removed, and places the first tool 8 in the spindle 4. The tool exchange arm 6 also is configured to shift one tool at a time, i.e. placing the second tool 10 into an empty tool pot 18, 19 without exchanging the second tool 10 with a first tool 8 or placing the first tool 8 into the spindle 4 without first removing a second tool 10 from the spindle 4, i.e., when the spindle 4 is initially empty.

Figure 4:
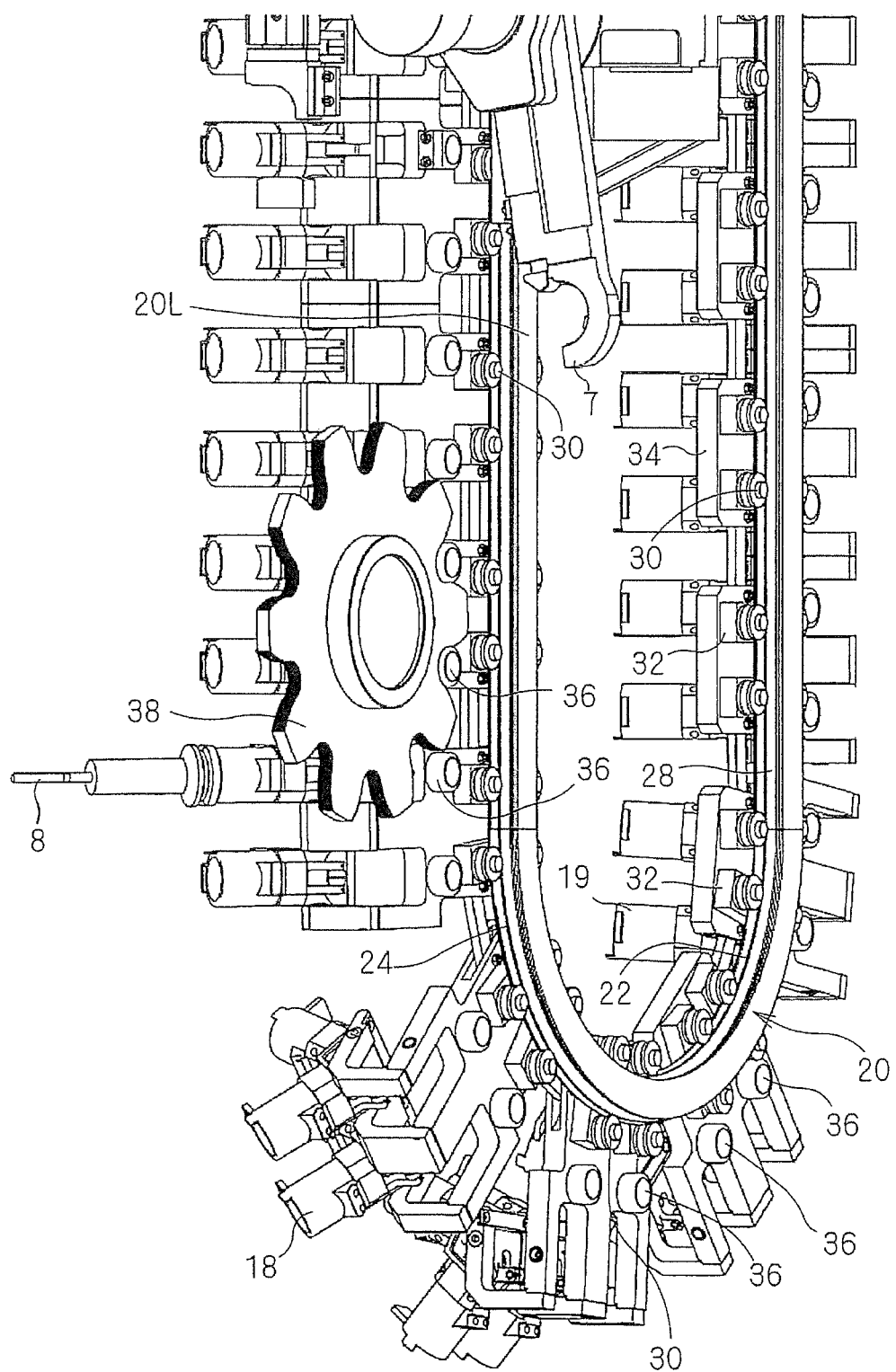
FIG. 4 is a perspective view of the underside of the tool magazine as viewed from the back side.

The tool magazine 1 is provided with an endless guide rail 20 (to be understood as an annular rail) which follows a racetrack or obround path (to be understood as a circulation path), although other configurations are contemplated. As shown in FIG. 4, the guide rail 20 has inner and outer guide surfaces 22, 24 for guiding guide members of the tool carriages 14. Referring to, for example, FIG. 5, the upper surface 26 of the guide rail 20 may also provide guidance or support to the tool carriages 14. In addition, the guide rail 20 may be provided with a lower flange or lip 28 on each side of the guide rail 20 for providing support to the guide members of the tool carriages 14 (see, for example, FIG. 4).

Figure 5:
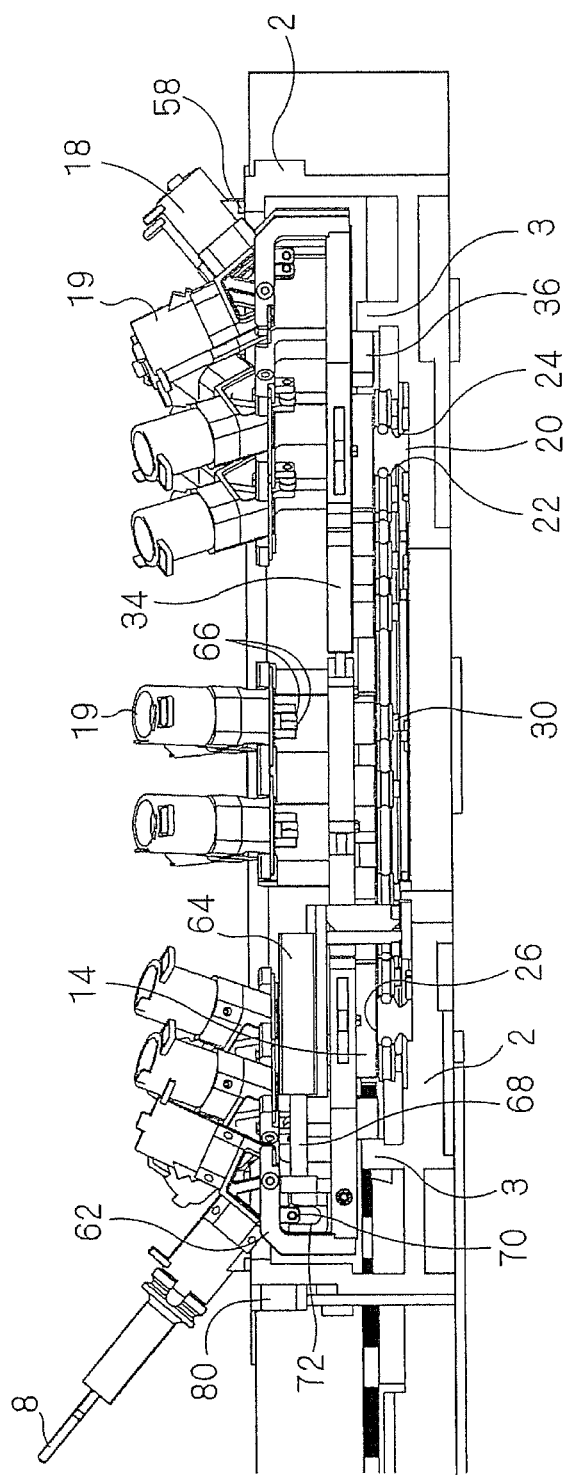
FIG. 5 illustrates an arrangement state of some tool carriages.

The tool carriages 14 are configured to follow the guide rail 20 via guide members of the tool carriages 14. The guide members include a pair of guide rollers 30 (to be understood as guide members). That is, each tool carriage 14 has a pair of guide rollers 30. The guide rollers 30 are spaced apart so as to be located on either side of the guide rail 20. Accordingly, a guide roller 30 located on the inside of the guide rail 20 will engage and be guided by one or more of the inner guide surface 22 and the lower lip 28 on the inside of the rail 20, and a guide roller 30 on the outside of the guide rail 20 will engage and be guided by one or more of the outer guide surface 24 and the lower lip 28 on the outside of the rail 20. The upper surface 26 of the guide rail 20 may also function as guidance or support to the guide member. The tool magazine 1 may contain other structure for guiding the tool carriages 14 in lieu of or in addition to the guide rail 20. As shown in FIG. 5, the magazine frame 2 includes a carriage support projection 3 which extends around all or part of the magazine frame 2 to provide additional guidance or support to the tool carriages 14.

As shown in FIG. 4, each pair of guide rollers 30 are rotatably connected to a roller mount 32. The roller mount 32 is oriented transversely to the guide rail 20. The roller mount 32 is connected to the underside of a carriage body 34. Each tool carriage 14 includes two spaced apart roller mounts 32 and two pairs of guide rollers 30 for smoothly guiding the tool carriages 14 about the guide rail 20. The illustrated guide rail 20 and guide roller configuration allow for very smooth operation of the magazine, and as an advantageous effect of its relatively open configuration, fouling, jamming and the like due to deposits or other foreign matters minimally occur.

The tool carriage 14 also includes structure for engaging with a conveyance system to convey the tool carriages 14 in either direction along the rail 20. In the illustrated embodiment, two spaced-apart cam followers in the form of cam rollers 36 are rotatably mounted to the underside of the carriage body 34. The cam rollers 36 are mounted near the outside corners of the carriage body 34 and are configured to engage with a cam (sprocket 38). The sprocket 38 may be driven by a motor, such as a servo motor (not shown) for accurate control of the location of the tool carriages 14 along the guide rail 20.

Figure 3:
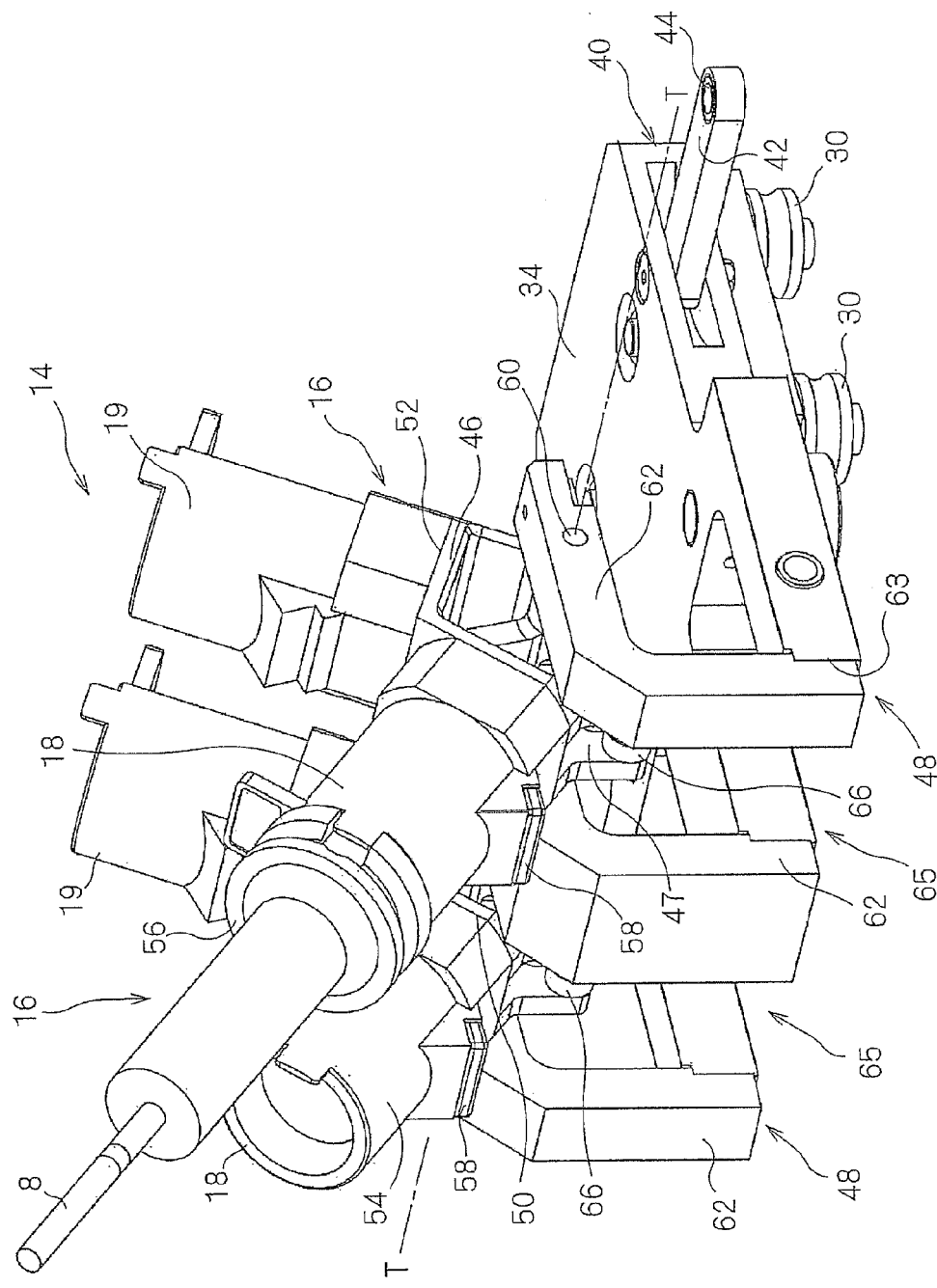
FIG. 3 is a perspective view of a tool carriage including tool holders.

Each lateral side of the carriage body 34 includes connecting structure for connecting the tool carriage 14 to adjacent tool carriages 14. The tool magazine 1 includes a linkage 42. As shown in FIG. 3, the carriage body 34 includes a hitch portion 40 for receiving the linkage 42. The linkage 42 connects the tool carriage 14 to adjacent tool carriages 14. Each end of the linkage 42 is rotatably captured in the adjacent hitch portion 40 of adjacent tool carriages 14 to connect the adjacent tool carriages 14 to one another. The hitch portion 40 is configured to allow the linkage 42 to rotate to at least some extent. Accordingly, the tool carriages 14 have freedom to move with respect to one another and therefore can travel around the curved portions of the guide rail 20. In particular, each linkage 42 includes a through opening 44 at each end through which a pin or fastener (not shown) extends within a through opening in the adjacent hitch portion 40. The rigid rotatable connection of the tool carriages 14 via the linkage 42 effectively provides reliable positioning of the tool carriages 14 at the tool exchange location 12, and further helps prevent jamming or rough operation caused by debris or foreign matters on or along the guide rail 20. This is because that debris or foreign matters can be avoided due to the degree of freedom of the tool carriages 14 to move with respect to one another. The guide rollers 30 may be configured to allow some lateral shifting with respect to the guide rail 20 for this purpose, as well as to allow the tool carriages 14 to move on the curved portions of the guide rail 20.

The tool holders 16 and related structure will now be described in further detail. FIG. 3 shows the entire configuration of one tool carriage 14 provided with two tool holders 16. In one preferred form, the tool holder 16 includes a tool holder body 46. The tool holder body 46 is pivotally mounted to a tool holder support frame 48. The tool holder support frame 48 is connected to the outer facing surface of the carriage body 34. The tool holder 16 has a first tool pot socket 50 and a second tool pot socket 52. Although another form is also available, a normal line of an opening surface of the first tool pot socket 50 forms approximately 90° with a normal line of an opening surface of the second tool pot socket 52. That is, the tool pot 18 mounted to the first tool pot socket 50 forms a predetermined angle with the tool pot 19 mounted to the second tool pot socket 52 in a pivoting direction about a predetermined pivot axis (tool holder pivot axis T) (i.e., an "L" shape or a "V" shape is formed by the tool pot 18 mounted to the first tool pot socket 50 and the tool pot 19 mounted to the second tool pot socket 52). Each tool pot socket 50, 52 is configured to receive a tool pot 18, 19. That is, the tool pots 18, 19 can be mounted to the tool holder 16 via the tool pot sockets 50, 52. The second tool pot socket 52 is best observed in FIG. 8, which is visible because the second tool pot 19 is omitted in FIG. 8. As shown in FIG. 3, the tool pots 18, 19 have a cylindrical body 54 for receiving a tool adapter 56. The tool adapter 56 holds a tool, such as the first tool 8. Each tool adapter 56 is configured to hold a variety of different tools such as the tools 8, 10. However, each tool adapter 56 has a common outer configuration adapted to be releasable from the spindle 4 and the tool pots 18, 19. With this configuration, the tool pots 18, 19 and the spindle 4 can hold different tools.

Figure 10:
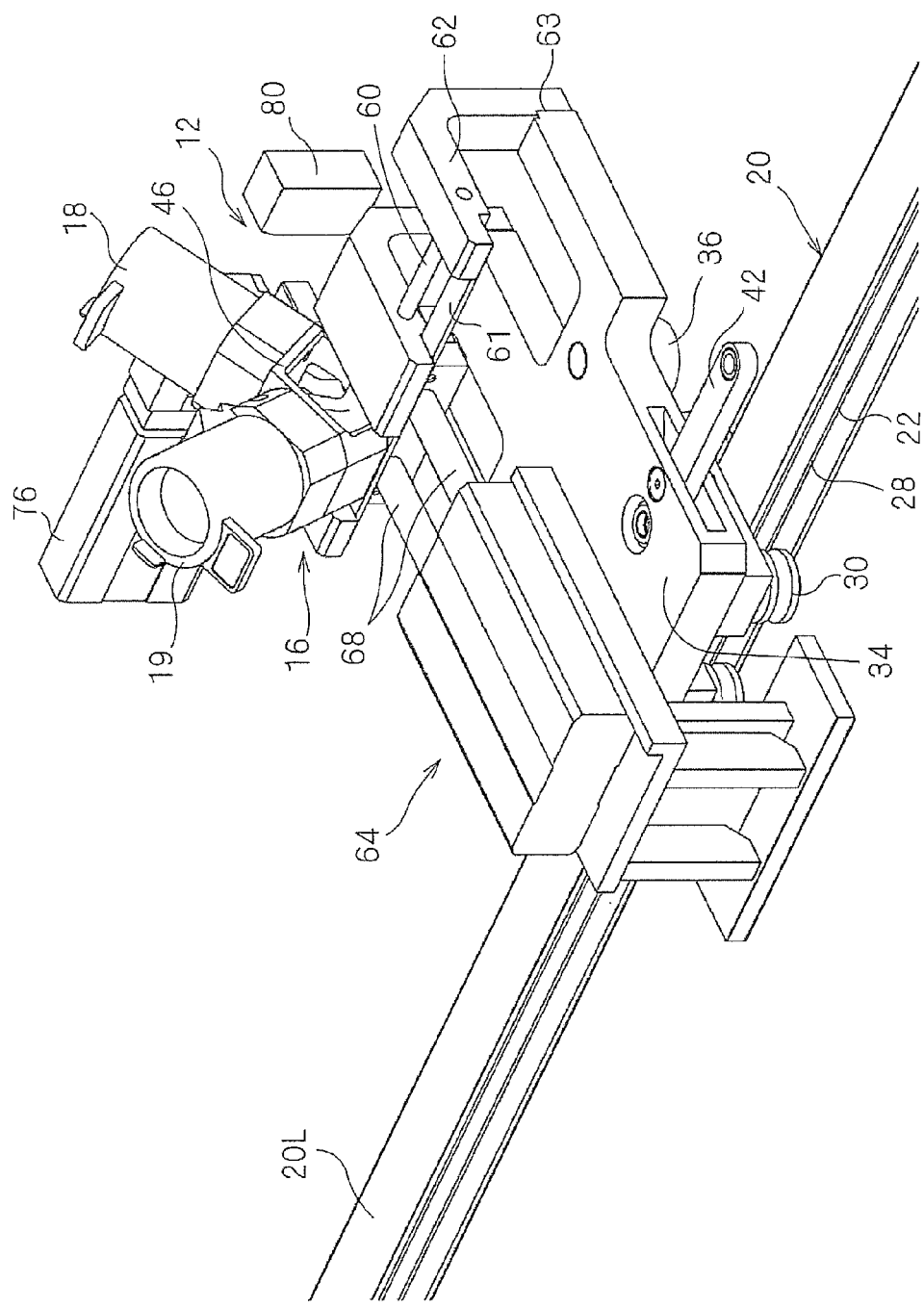
FIG. 10 is a perspective view illustrating the configuration of the tool magazine near the tool exchange location.

The tool holder body 46 includes a through opening near its apex. A shaft 60 extends through the through opening to define a tool holder pivot axis T (see FIG. 3). The tool holder 16 may pivot about the tool holder pivot axis T (to be understood as a predetermined pivot axis). Tool holder pivot axis T is generally parallel to the guide rail longitudinal axis and the direction of travel of the tool carriage 14 along straight line portions 20L of the guide rail 20. The shaft 60 extends between and is supported by opposing arms 62 of the tool holder support frame 48. The arms 62 are connected at a transverse mounting portion 63. The transverse mounting portion 63 is connected to the outside edge of the carriage body 34. As shown in FIG. 10, a stop bar 61 spanning between the distal ends of the opposite arms 62 is provided to keep the tool holder 16 in the tool storage orientation. When the tool holder 16 is in the tool storage orientation, the tool holder body 46 is partially brought into contact with the stop bar 61. In particular, the stop bar 61 keeps the tool holder 16 from pivoting beyond the tool storage orientation in the counter-clockwise direction about the tool holder pivot axis T, as viewed in FIG. 10. The tool holder body 46 and the tool pots 18, 19 are configured to pivot in a gap 65 (see FIG. 3) between the adjacent arms 62 when engaged by the tool holder actuator (to be understood as a turning unit or a turning device) 64 from the tool storage orientation into first or second tool exchange orientations 82 or 84 of the tool holder 16 shown in FIGS. 6 and 7, which will be described in further detail below. As can be seen from the above description, the tool holder 16 is disposed to be pivotable about the predetermined pivot axis (tool holder pivot axis T) with respect to the tool carriage 14 (in particular, arm 62). Although the illustrated tool holders 16 are configured to pivot about the predetermined pivot axis to shift into the tool exchange orientations 82, 84, other ways of shifting the tool holders 16 is contemplated.

Figure 9:
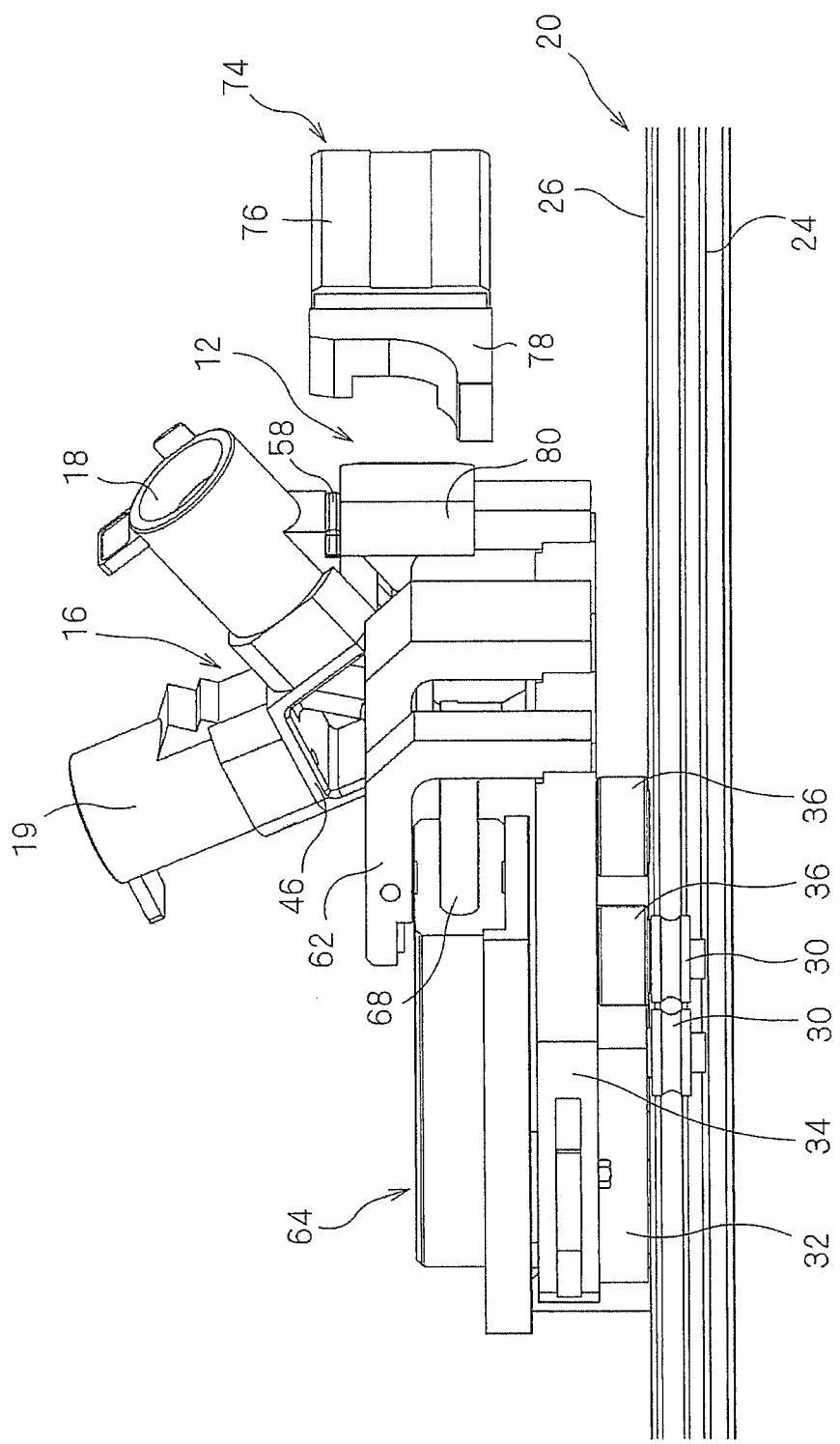
FIG. 9 is a perspective view illustrating a configuration of the tool magazine near a tool exchange location.

Each tool holder 16 includes structure for engaging with the tool holder actuator 64. As shown in FIG. 3, the tool holder 16 includes a cam follower in the form of two side-by-side cam rollers 66 (see FIG. 5) rotatably mounted to the outer facing surface 47 of the tool holder body 46. The cam rollers 66 are configured to rotate about an axis parallel to the tool holder pivot axis T of the tool holder 16. As shown in FIGS. 5, 9, and 10, the tool holder actuator 64 includes a plurality of linearly shiftable shafts 68 which terminate in a u-shaped hook member 72. The u-shaped hook member 72 includes a cam surface 70 formed on the inner facing surface thereof. With the linearly shiftable shafts 68 of the tool holder actuator 64 in an extended position, the cam rollers 66 of each of the tool holders 16 can pass through the opening in the u-shaped hook member 72 when the tool carriages 14 are conveyed about the guide rail 20 to bring the next desired tool to the tool exchange location 12.

Figure 6:
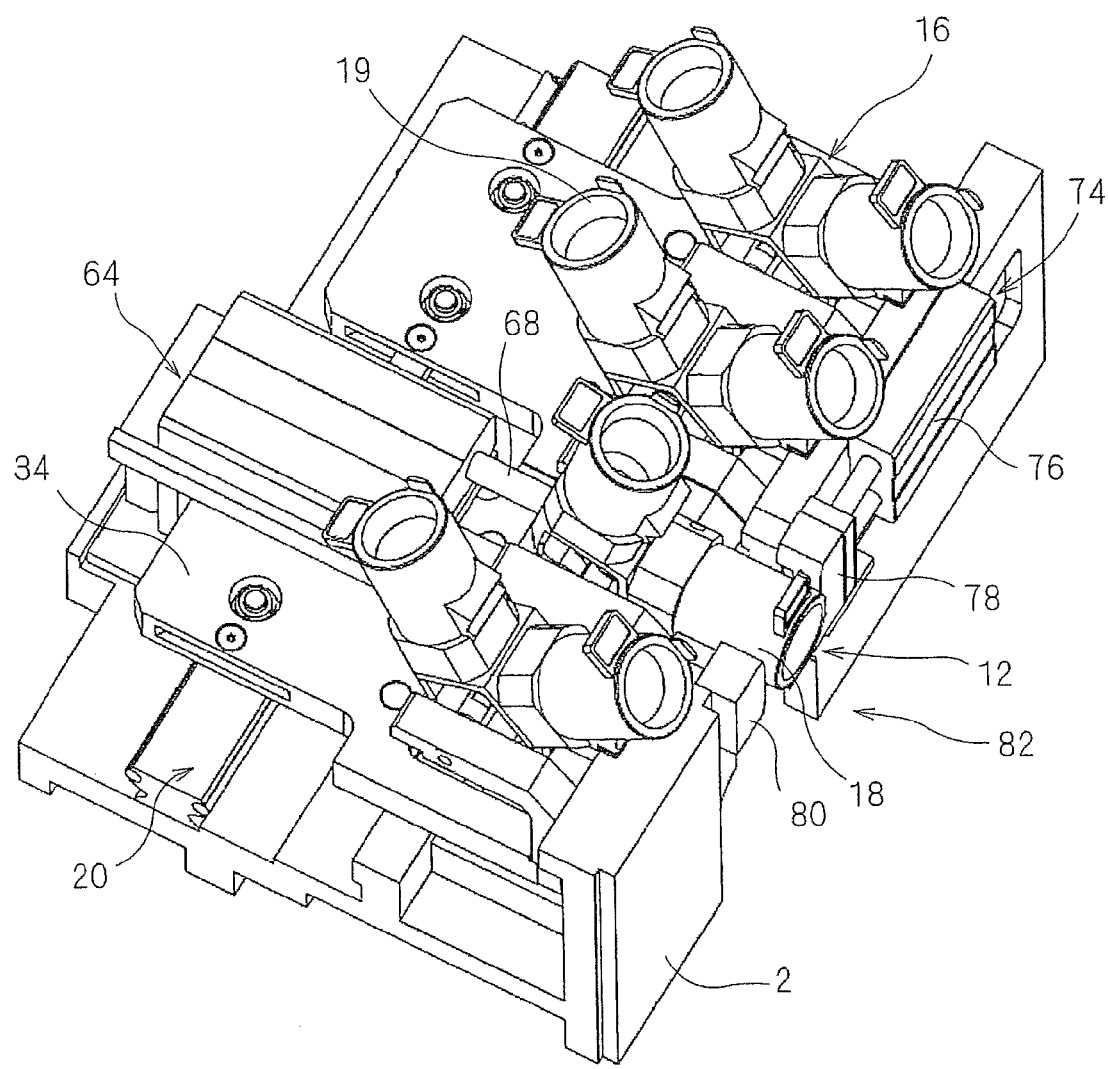
FIG. 6 is a fragmented perspective view illustrating the pivoting of the tool holder.
Figure 7:
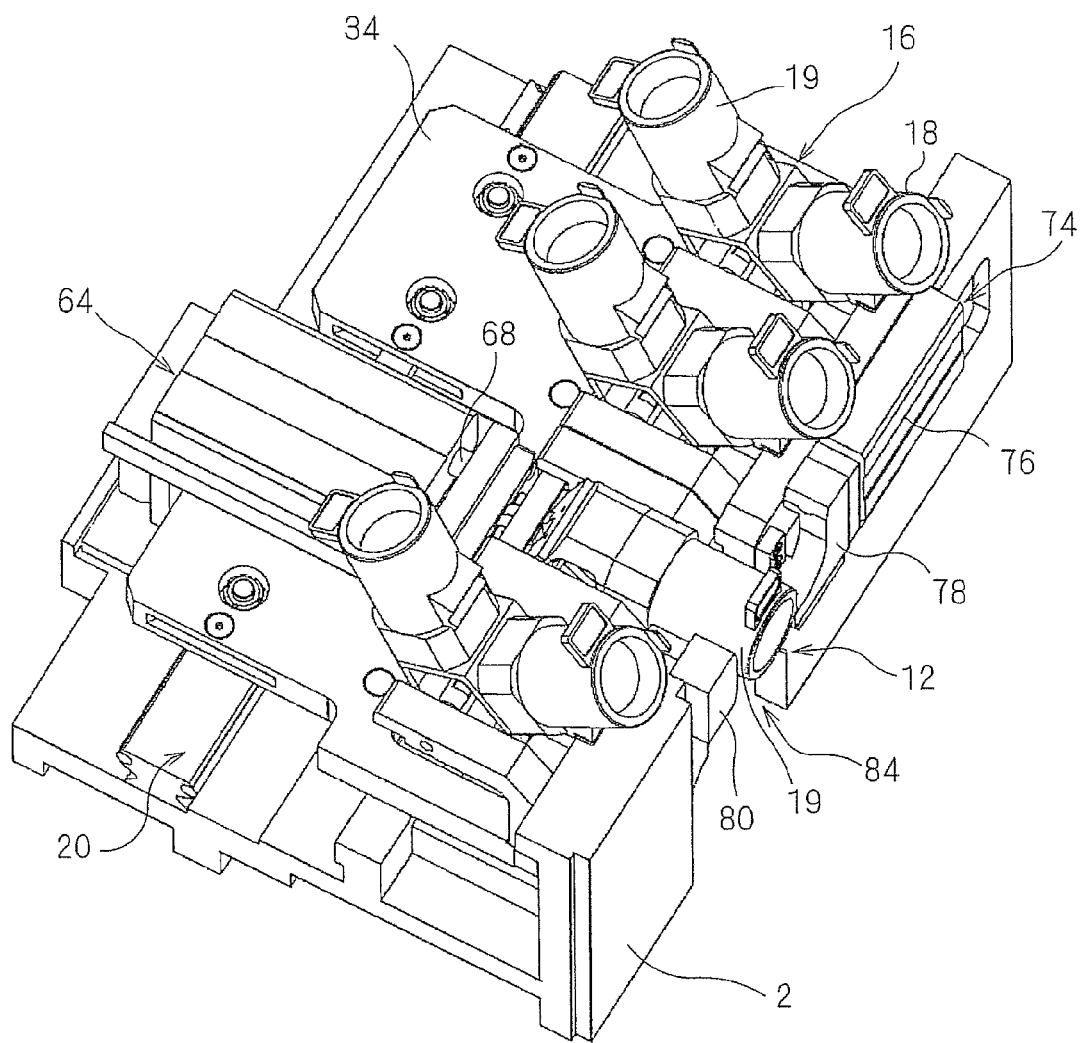
FIG. 7 is a fragmented perspective view illustrating the pivoting of the tool holder.

The tool holder actuator 64 allows the tool holder 16 to pivot about the tool holder pivot axis T at a predetermined position of the guide rail 20. When the desired tool holder 16 arrives at the tool exchange location 12 of the tool magazine 1, the cam rollers 66 of the desired tool holder 16 will reside within the opening formed by the u-shaped hook member 72, and the linearly shiftable shafts 68 may be retracted to pull the u-shaped hook member 72 towards the tool holder actuator 64. The cam rollers 66 will be pulled towards the body of the tool holder actuator 64, causing the tool holder 16 to pivot about the tool holder pivot axis T. The tool holder actuator 64 will continue to retract the linearly shiftable shafts 68 and pivot the tool holder 16 until the tool holder 16 is in the desired first or second tool exchange orientations 82 or 84. In the first tool exchange orientation 82 shown in FIG. 6, the tool exchange arm 6 can access the first tool pot 18 to remove a tool therefrom or place a tool therein. In the second tool exchange orientation 84 shown in FIG. 7, the tool exchange arm 6 can access the second tool pot 19 to remove a tool therefrom or place a tool therein. In the embodiment shown in FIG. 3, the tool holder 16 is pivoted approximately 45 degrees to orient the tool holder 16 in the first tool exchange orientation 82. Thus, the first tool pot 18 is in the tool exchange location 12 and the tool exchange arm 6 can access the first tool pot 18. In particular, the longitudinal axis of the first tool pot 18 is parallel to the axis of the spindle 4 in the first tool exchange orientation 82. Thus, the tool exchange arm 6 can simultaneously remove tools from the spindle 4 and the tool pot 18 and then rotate a half turn to switch the locations of the removed tools and similarly place the removed tools in the tool pot 18 and spindle 4. When the tool holder 16 is in the first tool exchange orientation 82, the longitudinal axis of the second tool pot 19 is orthogonal to the axis of the spindle 4. To shift the tool holder 16 into the second tool exchange orientation 84, the tool holder 16 is pivoted approximately 135 degrees about the tool holder pivot axis T from its initial tool storage orientation (shown in FIG. 3), i.e. approximately an additional 90 degrees from the first tool exchange orientation 82. Thus, the second tool pot 19 is in the tool exchange location 12 as shown in FIG. 7. The first and second tool exchange orientations 82, 84 of the tool holder 16 place the first and second tool pots 18, 19 in the same tool exchange location relative to the tool exchange arm 6 and the tool carriage 14, such that the path of the tool exchange arm 6 to remove or replace tools in either of the first and second tool pots 18, 19 is identical. In other embodiments, the first and second tool pots 18, 19 may be moved into different positions relative to the tool exchange arm 6 for exchanging tools held by the first and second tool pots 18, 19.

The tool pot stopper 74 shown in FIG. 9 stops the tool pots 18, 19. The tool pot stopper 74 may be used to provide a positive stop either the tool pot 18 or 19 at the tool exchange location 12 to ensure the proper positioning of the tool pots 18, 19 for error-free exchanging of tools. In other words, the tool pot stopper 74 can stop the first and second tool pots 18, 19 at the predetermined pivot position (tool exchange location 12) in the pivoting direction about the tool holder pivot axis T. The tool pot stopper 74 is particularly useful for stopping the first tool pot 18 at the first tool exchange orientation 82 in the tool exchange location 12, because the first tool pot 18 may be provided with a stop portion 58 on the body 54 of each pot as shown in FIG. 3. As shown in FIG. 7, when the second tool pot 19 is shifted into the second tool exchange orientation 84, the stop portion 58 of the first tool pot 18 abuts against a stop surface on the transverse mounting portion 63 of the aim 62. Accordingly, it is possible to prevent the further pivoting of the tool holder 16 after the second tool pot 19 reaches the second tool exchange orientation 84. With this configuration, in the case where the tool pot stopper 74 does not stop the first tool pot 18, the tool holder 16 is pivoted beyond the first tool exchange orientation 82 until the first tool pot 18 abuts against the stop surface. Further, as shown in FIG. 5, during a period that the tool holder 16 is in the tool storage orientation, the stop portion 58 of the first tool pot 18 abuts against the magazine frame 2 and hence, the tool holder 16 can be held in a stable orientation. The stop surface may be formed on the magazine frame 2 or the tool carriage 14 of the tool magazine 1.

As shown in, for example, FIG. 9, the tool pot stopper 74 includes a linear actuator (to be understood as an actuator) 76 and a stop member 78. As shown in FIGS. 6 and 7, the stop member 78 can receive the respective tool pots 18, 19 at the tool exchange location 12. The linear actuator 76 shifts the stop member 78 towards the tool exchange location 12 of the respective tool pots 18, 19. A limit 80 is mounted to the magazine frame 2 opposite from the linear actuator 76. As shown in FIG. 6, the linear actuator 76 shifts the stop member 78 towards the limit 80 to keep the first tool pot 18 from being pivoted past the first tool exchange orientation 82 (i.e. moves the stop member 78 towards the extended position). As shown in FIG. 6, with this configuration, the stop member 78 can receive the first tool pot 18 in the tool exchange location 12 (first tool exchange orientation 82). Once the tool exchange operation has been completed, the linear actuator 76 will retract the stop member 78 away from the limit 80 until it is needed again for a subsequent tool change operation. Optionally, the stop member 78 could remain in the extended position until the tool holder 16 is required to be shifted to the second tool exchange orientation 84 shown in FIG. 7. Thus, the stop member 78 can stop the second tool pot 19 in the tool exchange location 12 (second tool exchange orientation 84).

Preferably, the tool pots 18, 19 are removably connected to the tool pot sockets 50, 52. Thus, the user may customize each tool holder 16 to have zero, one, or two tool pots 18, 19. This way, the number of tools that may be held by the tool magazine 1 may be easily customized depending on the number of tools needed by the end user. For instance, in the illustrated embodiment, the tool magazine 1 has 20 tool carriages 14, each of which having two tool holders 16. Because each tool holder 16 has two tool pots 18, 19, each tool holder 16 may hold up to two tools. Accordingly, the tool magazine 1 can be configured to hold any number of tools between zero and 80. It is contemplated that the tool holders 16 may be configured to hold more than two tools to further expand the capacity of the tool magazine 1 and provide additional customization options. In addition, a greater or smaller number of tool carriages 14 could be provided, or each tool carriage 14 could be provided with one or more than two tool holders 16 to further vary the capacity of the tool magazine 1, as would be apparent to one of skill in the art.

Figure 8:
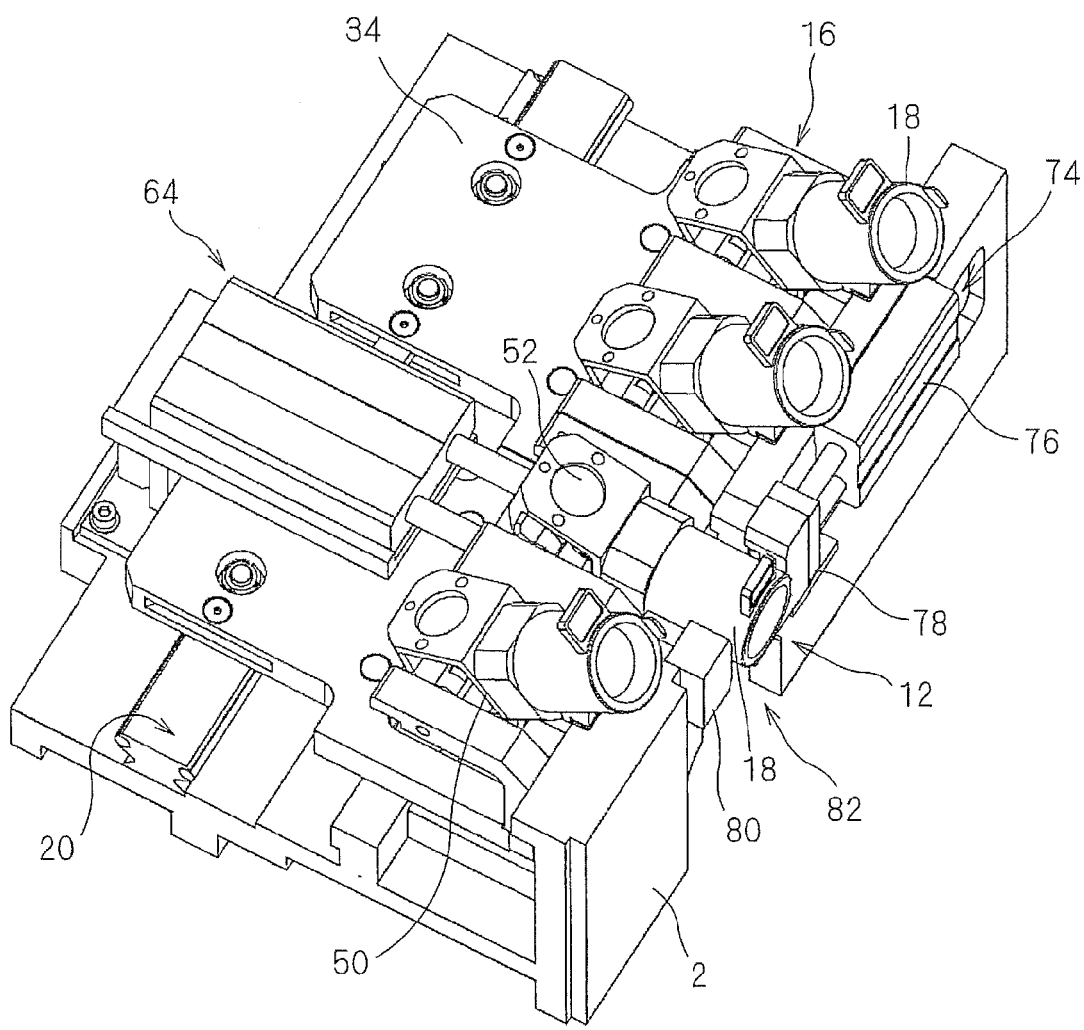
FIG. 8 is a fragmented perspective view illustrating the pivoting of the tool holder.

In one form shown in FIG. 8, the tool holders 16 may be provided with a single tool pot 18 mounted to the first tool pot socket 50 while leaving the second tool pot socket 52 open. Such a configuration shown in FIG. 8 may be used if the end user does not need the full capacity of the tool magazine 1, or anticipates later expansion of the tool set to be used with the machine tool. Accordingly, the tool magazine 1 illustrated in FIGS. 1 and 2 may be provided with 80 tool pots 18, 19 as shown, or if tool pots 19 are omitted from the second tool pot sockets 52 of each tool holder 16, the tool magazine 1 will have 40 tool pots 18, and accordingly have capacity for 40 tools. Advantageously, all of the same components may be used for a tool magazine 1 having a capacity of 40 or 80 tools, with the only difference being the number of tool pots 18, 19 used. Such a modular design reduces the number of components needed to produce a tool magazine 1 having a wide variety of tool capacities while maintaining the same sized footprint, thereby reducing cost. Further, tool pots 18, 19 may have an identical construction. Thus, the tool pots 18, 19 may be used at either the first or second tool pot socket 50, 52. Accordingly, a user may keep a number of tool pots 18, 19 on hand to customize the capacity of the tool magazine 1 if desired.

The tool changer 100 according to this embodiment includes: the tool magazine 1 that holds the tools 8; and the tool exchange arm 6 that exchanges the tools 8, 10 between the tool magazine 1 and the spindle 4. Further, the tool magazine 1 includes the guide rail 20, the tool carriage 14, the tool pots 18, 19, the tool holder 16, the tool holder actuator 64, and the tool pot stopper 74 that respectively have the above-mentioned configurations. The tool holder 16 has the first tool pot socket 50 and the second tool pot socket 52. The first tool pot 18 mounted to the first tool pot socket 50 forms a predetermined angle with the second tool pot 19 mounted to the second tool pot socket 52, in the pivoting direction about the tool holder pivot axis T.

Accordingly, it is possible to provide the tool magazine 1 that can be manufactured at low cost with simple configuration and can increase the number of tools to be stored. For example, whichever part of the tool magazine 1 the tools are stored, it is possible to shift the tool holder 16 from the tool storage orientation to the tool exchange orientation 82, 84, by the pivoting of the tool holder 16 about the pivot axis T one time. Accordingly, the tool holder 16 can be shifted from the tool storage orientation to the tool exchange orientation 82, 84 without using an expensive actuator such as a servo motor. In this manner, the tool magazine 1 does not include an expensive actuator and complicated mechanisms and hence, the tool magazine 1 has the simple structure whereby a burden on maintenance of the tool magazine 1 can be reduced and the reduction of the cost of the tool magazine 1 can be also expected. Further, the tool holder 16 has two tool pot sockets 50, 52 and hence, the number of tools which can be stored in the tool magazine 1 can be also increased without changing the size of the tool magazine 1.

It may also be contemplated as to a tool magazine that a chain or an endless band is used for moving the tool holder around the tool magazine. In the tool magazine, however, excessively large vibrations might be generated in the system thus giving rise to a drawback in reliability. Further, a tool magazine having a chain drive mechanism needs to apply a proper tension to the chain for ensuring a proper operation, and hence requires proper setting of the tension and periodical maintenance. The tension of the chain changes with time due to a factor such as a load brought about by a tool held by a tool holder.

The tool magazine 1 according to this embodiment adopts a method of moving the tool carriages 14 along the guide rail 20. Accordingly, the tool magazine 1 according to this embodiment does not have the above-mentioned respective drawbacks caused by tension of a chain.

In the tool magazine 1 according to this embodiment, a plurality of tool carriages 14 is provided. Accordingly, the number of tools which can be stored in the tool magazine 1 can be further increased.

In the tool magazine 1 according to this embodiment, the guide rail 20 has the straight line portion 20L, and the tool holder pivot axis T is parallel to the direction along which the tool carriages 14 move on the straight line portion 20L. With this configuration, the tool holder actuator 64 that allows the tool holder 16 to pivot about the pivot axis T can be fixed to the tool magazine 1 at the position orthogonal to a moving path (straight line portion 20L) of the tool carriages 14. Accordingly, it is possible to avoid the interference between the tool carriage unit 64 and the moving tool carriage 14 with the simple configuration.

In the tool magazine 1 according to this embodiment, the tool pot stopper 74 includes: the stop member 78 that receives the tool pot; and the linear actuator 76 that moves the stop member 78 to the tool exchange location 12.

Accordingly, the linear actuator 76 can shift the stop member 78 to the tool exchange location 12. With this configuration, at the time of exchanging tools in the tool exchange location 12, the tool pots 18, 19 can be fixed by the stop member 78. Accordingly, at the time of a tool exchange, the positioning of the tools can be performed accurately. Further, it is possible to prevent the tool holder 16 from being influenced by an impact generated when tools are placed in or removed from the tool pots 18, 19.

In the tool magazine 1 according to this embodiment, a plurality of tool holders 16 are provided, and the tool carriage 14 has two or more tool holders 16. The tool pots 18, 19 are removable from the tool pot sockets 50, 52. The tool pots 18, 19 have an identical construction.

Accordingly, a tool storing ability of the tool magazine 1 can be increased or can be flexibly changed depending on a size of the tool magazine 1.

It may also be contemplated as to a tool magazine that a guide groove is used to provide a path around which tool holders can shift. The tool magazine may have another drawback in reliability particularly attributed to chips scattered in a machining operation or other foreign matters entering the guide groove.

In the tool magazine 1 according to this embodiment, the tool carriage 14 includes a guide member guided by the guide rail 20. The tool magazine 1 also includes the linkage structure that links the adjacent tool carriages 14.

Accordingly, reliability in positioning the tool carriage 14 at the tool exchange location 12 can be enhanced. Further, a system for moving a plurality of tool carriages 14 on the guide rail 20 has the simple structure and hence, foreign matters or the like adhering to the guide rail 20 can be easily removed.

Although the invention has been described in connection with a preferred embodiment, it will be understood that various changes in the details, materials, and arrangements of the parts and components that have been described and illustrated in order to explain the nature of the invention may be made by those skilled in the art within the principle and scope of the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A tool magazine comprising:
   at least one tool carriage movable along a circulation path;
   tool pots including a first tool pot and a second tool pot to hold a tool;
   tool holders each having tool pot sockets to which the tool pots are mountable, the tool holders being pivotably attached to the at least one tool carriage for pivoting with respect to the at least one tool carriage about a pivot axis, the tool pot sockets including a first tool pot socket and a second tool pot socket, a non-zero angle being created in a pivoting direction about the pivot axis between a longitudinal axis of the first tool pot mounted to the first tool pot socket and a longitudinal axis of the second tool pot mounted to the second tool pot socket;
   a turning device to turn each of the tool holders about the pivot axis at a position on the circulation path; and
   a tool pot stopper to position each of the tool pots and to stop the pivoting of one of the first tool pot and the second tool pot in the pivoting direction.

2. The tool magazine according to claim 1, further comprising:
   an annular rail disposed along the circulation path and having a straight line portion, wherein
   the pivot axis is parallel to a direction along which the at least one tool carriage moves on the straight line portion.

3. The tool magazine according to claim 2, wherein
   the at least one tool carriage includes a plurality of tool carriages, and
   each of the plurality of tool carriages comprises:
      a guide member guided along the annular rail; and
      a linkage structure to link one tool carriage among the plurality of tool carriages with another tool carriage among the plurality of tool carriages that follows the one tool carriage.

4. The tool magazine according to claim 2, wherein
   the tool pot stopper comprises:
      a stop member to stop one of the first tool pot and the second tool pot; and
      an actuator to move the stop member.

5. The tool magazine according to claim 1, wherein
   the tool pot stopper comprises:
      a stop member to stop one of the first tool pot and the second tool pot; and
      an actuator to move the stop member.

6. The tool magazine according to claim 1, wherein
   the tool pots are removable from the tool pot sockets.

7. The tool magazine according to claim 1, wherein
   each of the tool pots has a substantially identical construction.

8. A tool changer comprising:
   a tool magazine to hold a tool, the tool magazine comprising:
      at least one tool carriage movable along a circulation path;
      tool pots including a first tool pot and a second tool pot to hold a tool;
      tool holders each having tool pot sockets to which the tool pots are mountable, the tool holders being pivotably attached to the at least one carriage for pivoting with respect to the at least one tool carriage about a pivot axis, the tool pot sockets including a first tool pot socket and a second tool pot socket, a non-zero angle being created in a pivoting direction about the pivot axis between a longitudinal axis of the first tool pot mounted to the first tool pot socket and a longitudinal axis of the second tool pot mounted to the second tool pot socket;
      a turning device to turn each of the tool holders about the pivot axis at a position on the circulation path; and
      a tool pot stopper to position each of the tool pots and to stop the pivoting of one of the first tool pot and the second tool pot in the pivoting direction; and
   the tool changer further comprising:
   a tool exchange arm to exchange the tool between the tool magazine and a spindle.

* * * * *